US008041732B2

(12) United States Patent
Lee et al.

(10) Patent No.: US 8,041,732 B2
(45) Date of Patent: Oct. 18, 2011

(54) SYSTEM AND METHOD FOR DOWNLOADING TEXT CONTENT AND IMAGES IN WEB PAGES

(75) Inventors: Chung-I Lee, Taipei Hsien (TW); Chien-Fa Yeh, Taipei Hsien (TW); Da-Peng Li, Shenzhen (CN); Zhi-Hong Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

(*) Notice: Subject to any disclaimer, the term of this patent is extended or adjusted under 35 U.S.C. 154(b) by 276 days.

(21) Appl. No.: 12/331,382

(22) Filed: Dec. 9, 2008

(65) Prior Publication Data

US 2009/0157633 A1 Jun. 18, 2009

(30) Foreign Application Priority Data

Dec. 13, 2007 (CN) .......................... 2007 1 0203039

(51) Int. Cl.
*G06F 7/00* (2006.01)
(52) U.S. Cl. .................. 707/769; 707/803; 715/234
(58) Field of Classification Search ........... 707/999.001, 707/999.003, 769, 803; 715/234
See application file for complete search history.

(56) References Cited

U.S. PATENT DOCUMENTS

| 7,146,367 | B2 * | 12/2006 | Shutt ...................... 707/999.003 |
| 7,376,673 | B1 * | 5/2008 | Chalecki et al. ............ 707/999.2 |
| 2002/0078093 | A1 * | 6/2002 | Samaniego et al. ........... 707/513 |
| 2004/0107423 | A1 * | 6/2004 | Noda ............................. 719/311 |
| 2005/0102281 | A1 * | 5/2005 | Takahashi .......................... 707/3 |
| 2008/0201449 | A1 * | 8/2008 | Huang et al. .................. 709/218 |

FOREIGN PATENT DOCUMENTS

| CN | 1967534 A | 5/2007 |
| CN | 101071433 A | 11/2007 |

OTHER PUBLICATIONS

Cheng-Guang, the Journal "A Method for Web Information Collection Based on the XML," Published on Jul. 31, 2005, in Agricultural Network Information of China.

* cited by examiner

*Primary Examiner* — Shew-Fen Lin
*Assistant Examiner* — Jieying Tang
(74) *Attorney, Agent, or Firm* — Frank R. Niranjan

(57) ABSTRACT

A computer-based method for downloading text content and images in web pages is provided. The method includes downloading a web page as a temporary extensible markup language (XML) file in an application server, and searching the temporary XML file for predetermined information in the temporary XML file. The method further includes searching the temporary XML file for text content in the temporary XML file. Furthermore, the method includes converting a relative path of the image uniform resource locator (URL) to an absolute path by joining the URL of the web page to the front of the relative path of the image URL, and generating a local path for each image in the temporary XML file and storing each image into an application server according to the local path.

6 Claims, 3 Drawing Sheets

US 8,041,732 B2

SYSTEM AND METHOD FOR DOWNLOADING TEXT CONTENT AND IMAGES IN WEB PAGES

BACKGROUND OF THE INVENTION

1. Field of the Invention

Embodiments of the present disclosure relate to information management systems and methods, and more particularly to a system and method for downloading text content and images in web pages.

2. Description of Related Art

With the development of computer technology and network technology, the Internet has become a medium for users to acquire information. Usually, the users download the web pages into a database. Given the widespread use of downloading web pages in both private and business environments, there is a growing need or desire for the ability to query text content and images of the web pages quickly and accurately. Thus, it would be desirable to give the computer user the ability to focus on text content and images of the web pages.

Therefore, what is needed is a system and method for downloading text content and images in web pages, which can obtain text content and images of web pages quickly and efficiently.

DETAILED DESCRIPTION OF CERTAIN INVENTIVE EMBODIMENTS

All of the processes described below may be embodied in, and fully automated via, function code modules executed by one or more general purpose computers or processors. The code modules may be stored in any type of computer-readable medium or other computer storage device. Some or all of the methods may alternatively be embodied in specialized computer hardware. The function code modules may be stored in any type of computer-readable medium or other computer storage device.

Figure 1:
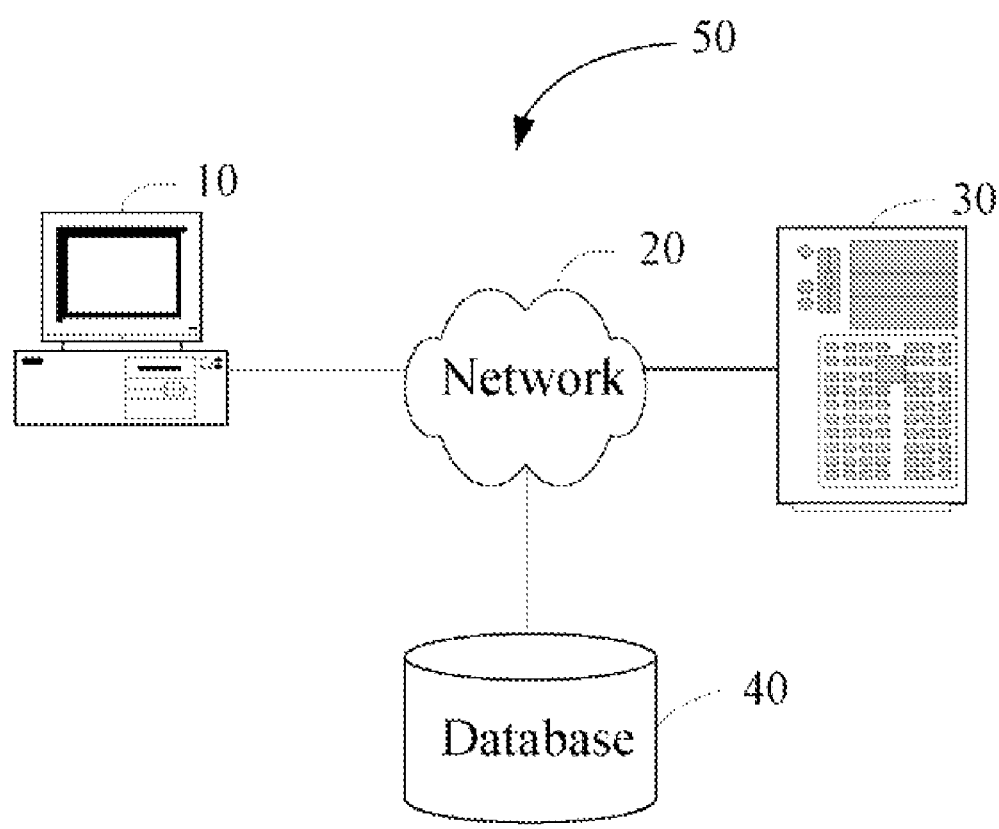
FIG. 1 is a block diagram of one embodiment of a system for downloading text content and images in web pages.

FIG. 1 is a block diagram of one embodiment of a system 50 for downloading text content and images in web pages. In this embodiment, the system includes an application server 30, a database 40, and one or more client computers 10 (only one shown). The database 40 and the one or more client computers 10 are connected to the application server 30 via a network 20. The application server 30 can access one or more web pages via the network 20, and store the web pages in the database 40. Depending on the embodiment, web pages can be downloaded as extensible markup language (XML) files. The application server 30 may be a personal computer (PC), a network server, or any other appropriate data-processing equipment. Each of the one or more client computers 10 is used for providing an operation interface for controlling one or more operations of the application server 30. The network 20 may be a wide area network (i.e., the Internet) or a local area network.

Depending on the embodiment, the text content of a web page may include text in the web page and text in the source of the web page. The text in the web page and the text in the source of the web page may include, but are not limited to, plain text, JavaScript, and cascading stylesheets. The images of a web page may include, but are not limited to various files have file extensions, such as .JPG, .GIF, .PNG, .SWF, for example.

Figure 2:
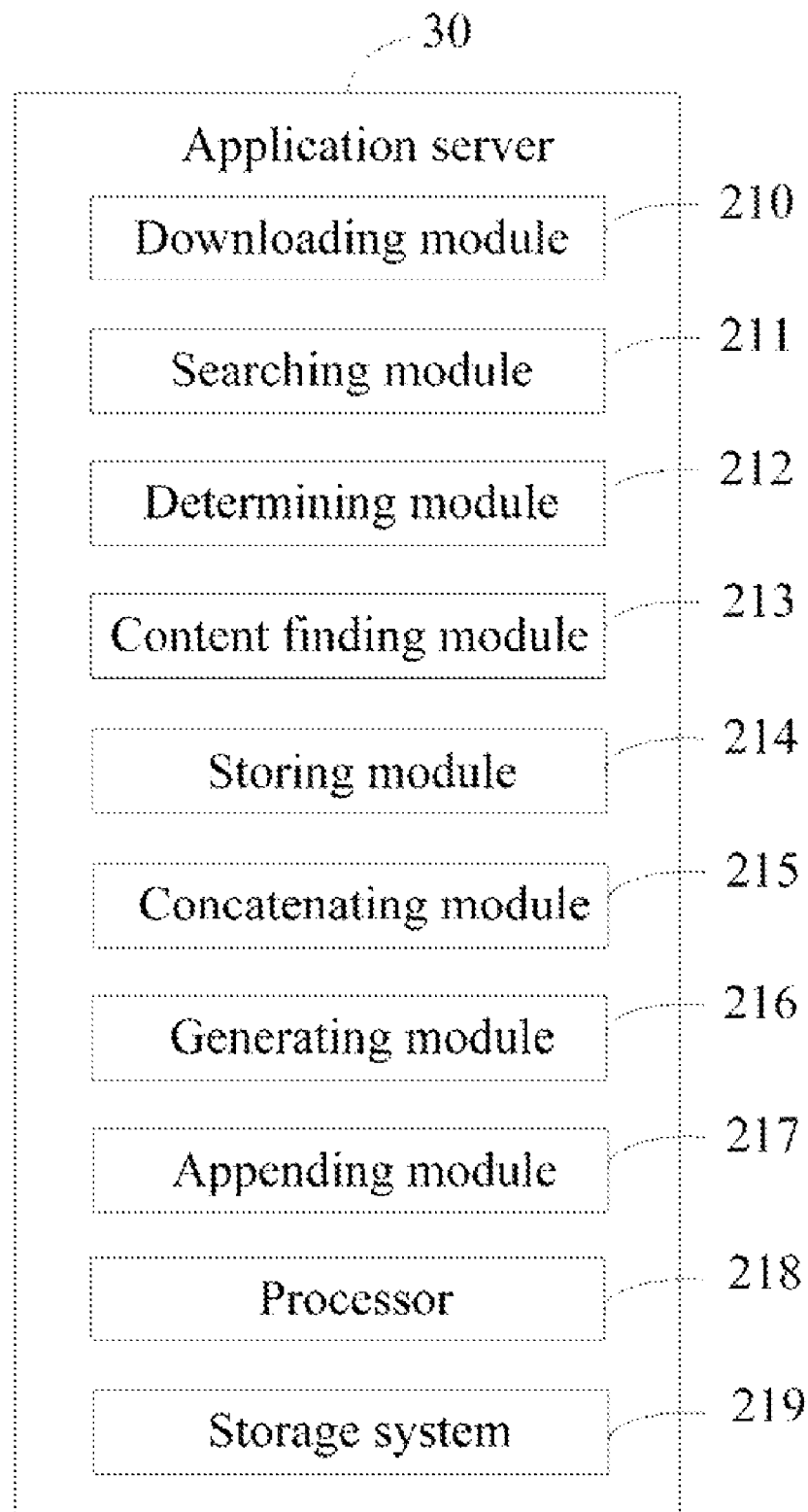
FIG. 2 is a block diagram of one embodiment of an application server of FIG. 1.

FIG. 2 is a block diagram of one embodiment of the application server 30 of FIG. 1. The application server 30 includes a downloading module 210, a searching module 211, a determining module 212, a content finding module 213, a storing module 214, a concatenating module 215, a generating module 216, and an appending module 217. The modules 210, 211, 212, 213, 214, 215, 216, 217 may be used to execute one or more operations for the application server 30. Additionally, the application server 30 may comprise one or more specialized or general purpose processors, such as a processor 218, for executing the modules 210, 211, 212, 213, 214, 215, 216, 217. The application server 30 may comprise a storage system 219.

The downloading module 210 is configured for downloading a web page from a website via the network 20. The web page may be downloaded as a temporary XML file to a cache of the application server 30. The cache may reside in a memory system of the application server 30, such as a cache of the processor 218, random access memory, or read only memory, for example.

The searching module 211 is configured for searching the temporary XML file for predetermined information in the temporary XML file. The predetermined information in the temporary XML files may include a creation/updated date of the web page corresponding to the temporary XML file, a uniform resource locator (URL) of the web page corresponding to the temporary XML file, and a title of the web page corresponding to the temporary XML file. The temporary XML file consists of nested elements, and each of the elements may contain a start tag, a close tag, and element content between the start tag and the close tag. For example, the element "<title> this web page </title>" has the start tag "<title>", the end tag "</title>", and the element content "this web page" between the start tag and the end tag. The searching module 211 searches the element contents "this web page" as the title of the web page corresponding to the temporary XML file.

The determining module 212 is configured for determining if the temporary XML file has been downloaded previously according to the predetermined information in the temporary XML file. In one embodiment, the determining module 212 searches downloaded web pages in the database 40 for the URL of the temporary XML file and the title of the temporary XML file to determine if the temporary XML file has already been previously downloaded. If the URL and the title of the temporary XML file can be found in at least one of the downloaded web pages, the determining module 212 determines that the temporary XML file has already been downloaded. Otherwise, the determining module 212 determines that the temporary XML file has not been downloaded.

The content finding module 213 is configured for searching the temporary XML file for text content, if the temporary XML file has not been downloaded previously. For example, the element "<content> The federal government's new $800-billion initiative to revive the nation's credit markets and reverse the deepening economic crisis propels the government into risky territory </content>" has the start tag "<content>", the end tag "</content>", and the element content "The federal government's new $800-billion initiative to revive the nation's credit markets and reverse the deepening economic crisis propels the government into risky territory" between the start tag and the end tag. The content finding module 213 searches the element contents "The federal government's new $800-billion initiative to revive the nation's credit markets and reverse the deepening economic crisis propels the government into risky territory" as the text content of the web page corresponding to the temporary XML file.

The storing module 214 is configured for storing the text content in the temporary XML file into the database 40.

The determining module 212 is further configured for determining if the temporary XML file contains one or more image URLs, and determining if a path of each of the image URL is an absolute path or a relative path. In one embodiment, if the image URL includes "http", the determining module 212 determines the image URL is an absolute path. For example, if a certain image URL is "1204/U1235P2DT20071204084850.jpg,", then the image URL is a relative path.

The concatenating module 215 is configured for converting the path of the image URL to the absolute path by joining the URL of the web page to the front of the path of the image URL if the path of the image URL is the relative path. In one embodiment, the concatenating module 215 joins the URL of the web page to the front of the path of the image URL. For example, if an image URL is "1204/U1235P2DT20071204084850.jpg," the URL of the web page is "http://tech.com.cn/," the concatenating module 215 joins "http://tech.com.cn/" to the front of the path of the image URL, then the concatenated image URL is "http://tech.com.cn/1204/U1235P2DT20071204084850.jpg."

The storing module 214 is further configured for storing the absolute path of each image URL in the temporary XML file and a current time into the database 40 as attributes of a corresponding image.

The generating module 216 is configured for generating a local path for each image in the temporary XML file and storing the image into a storage system 219 in the application server 30 according to the local path. The storage system 219 may be random access memory, or read only memory, or a hard disk drive, for example.

The appending module 217 is configured for appending each local path to attributes of a corresponding image into the database 40.

Figure 3:
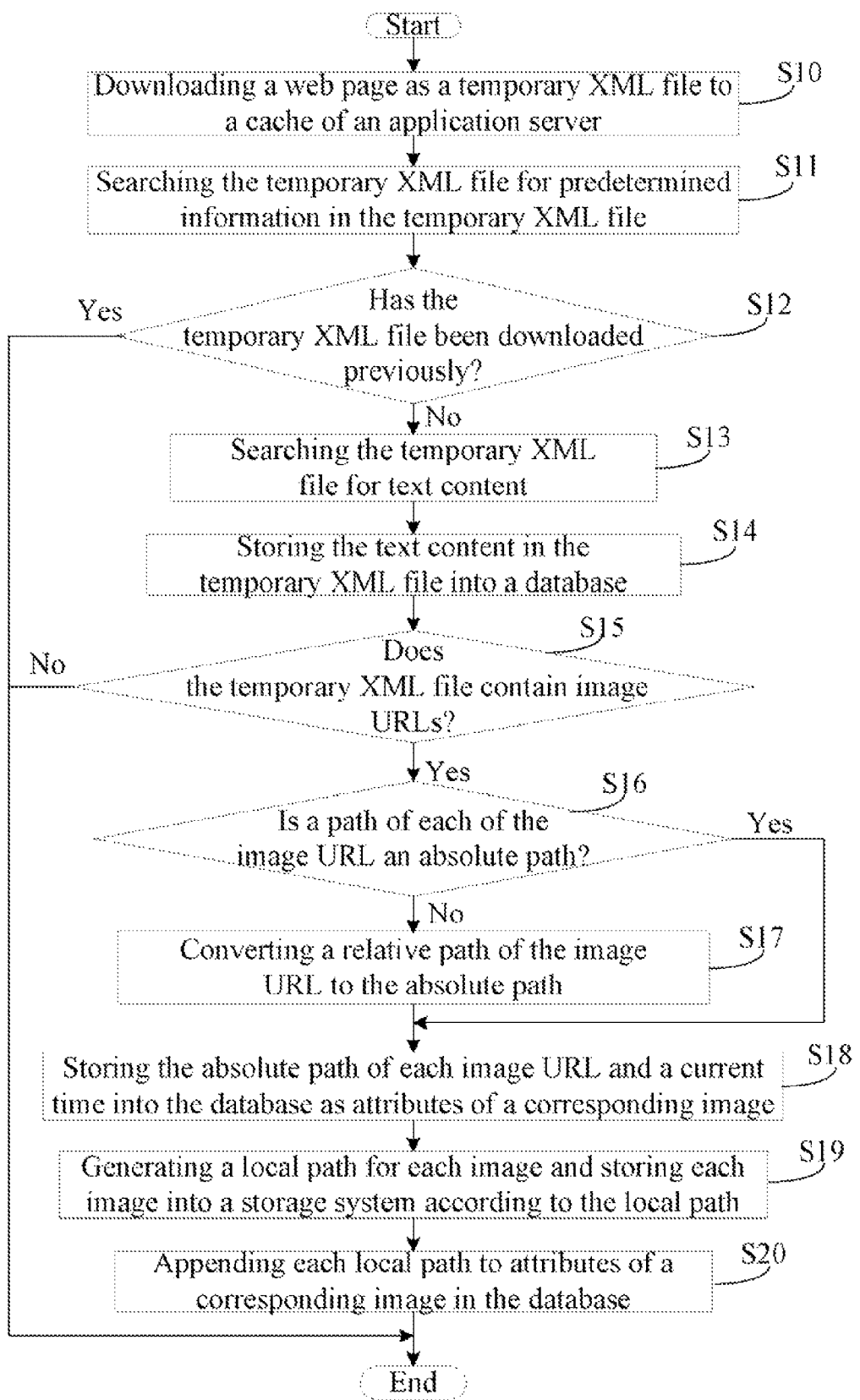
FIG. 3 is a flowchart of one embodiment of a method for downloading text content and images in web pages.

FIG. 3 is a flowchart of one embodiment of a method for downloading text content and images in web pages. Depending on the embodiment, additional blocks may be added, others deleted, and the ordering of the blocks may be changed.

In block S10, the downloading module 210 downloads a web page from a website as a temporary XML file to a cache of the application server 30.

In block S11, the searching module 211 searches the temporary XML file for predetermined information in the temporary XML file. As mentioned above, predetermined information in the temporary XML files may include a creation/updated date of the web page, a uniform resource locator (URL) of the web page, and a title of the web page corresponding to the temporary XML file.

In block S12, the determining module 212 determines if the temporary XML file has been downloaded previously according to the predetermined information in the temporary XML file. As mentioned above, the determining module 212 searches downloaded web pages into the database 40 for the URL of the temporary XML file and the title of the temporary XML file to determine if the temporary XML file has already been previously downloaded. If the URL and the title of the temporary XML file can be found in at least one of the downloaded web pages, the determining module 212 determines that the temporary XML file has already been downloaded. Otherwise, the determining module 212 determines that the temporary XML file has not been downloaded. For example, assumption that the URL of the web page corresponding to the temporary XML file is "http://tech.com.cn/," and the title of the web page corresponding to the temporary XML file is "technology", if the database 40 include the URL and the title, therefore the determining module 212 determines the temporary XML file has already been downloaded previously.

In block S12, if the determining module 212 determines the temporary XML file has been downloaded previously, the procedure ends. Otherwise, if the determining module 212 determines the temporary XML file has not been downloaded previously, in block S13, the content finding module 213 searches the temporary XML file for text content in the temporary XML file.

In block S14, the storing module 214 stores the text content in the temporary XML file into the database 40.

In block S15, the determining module 212 determines if the temporary XML file contains one or more image URLs. In one embodiment, if the temporary XML file contains an "image" tag, the determining module 212 determines the temporary XML file contains one or more image URLs.

In block S15, if the determining module 212 determines the temporary XML file does not contain one or more image URLs, the procedure ends. Otherwise, if the determining module 212 determines the temporary XML file contains one or more image URLs, in block S16, the determining module 212 determines if a path of each of the image URL is an absolute path or a relative path. As mentioned above, if the image URL includes "http", the determining module 212 determines the image URL is an absolute path.

In block S16, if the determining module 212 determines a path of each of the image URL is an absolute path, the procedure returns to block S18. Otherwise, if the determining module 212 determines a path of each of the image URL is a relative path, in block S19, the concatenating module 215 converts the path of the image URL to the absolute path by joining the URL of the web page to the front of the path of the image URL if the path of the image URL is the relative path. In one embodiment, the concatenating module 215 joins the URL of the web page to the front of the path of the image URL.

In block S18, the storing module 214 stores each image URL in the temporary XML file and a current time into the database 40 as attributes of a corresponding image.

In block S19, the generating module 216 generates a local path for each image in the temporary XML file and stores the image into a storage system 219 in the application server 30 according to the local path.

In block S20, the appending module 217 appends each local path to attributes of a corresponding image into the database 40.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A system for downloading text content and images in web pages, the system comprising:
 a downloading module configured for downloading a web page as a temporary extensible markup language (XML) file to a cache of the system;

a searching module configured for searching the temporary XML file for predetermined information in the temporary XML file, wherein the predetermined information in the temporary XML file comprises a uniform resource locator (URL) and a title of the web page corresponding to the temporary XML file;

a determining module configured for determining if the temporary XML file has been downloaded previously according to the predetermined information in the temporary XML file, and determining if the temporary XML file contains image URLs;

a content finding module configured for searching the temporary XML file for text content in response to the determination that the temporary XML file has not been downloaded previously;

a storing module configured for storing the text content in the temporary XML file into a database;

a concatenating module configured for converting a relative path of the image URL to an absolute path by joining the URL of the web page to the front of the relative path of the image URL in response to the determination that the temporary XML file contains image URLs;

the storing module further configured for storing the absolute path of each image URL in the temporary XML file and a current time into the database as attributes of a corresponding image;

a generating module configured for generating a local path for each image in the temporary XML file and storing each image into a storage system according to the local path;

an appending module configured for appending each local path to attributes of a corresponding image into the database; and at least one processor that executes the downloading module, the searching module, the determining module, the content finding module, the storing module, the concatenating module, and the generating module.

2. The system of claim 1, wherein the predetermined information in the temporary XML file further comprises a creation/updated date of the web page corresponding to the temporary XML file.

3. A computer-based method for downloading text content and images in web pages, the method comprising:

downloading a web page as a temporary extensible markup language (XML) file to a cache of an application server;

searching the temporary XML file for predetermined information in the temporary XML file, wherein the predetermined information in the temporary XML file comprises a uniform resource locator (URL) and a title of the web page corresponding to the temporary XML file;

searching the temporary XML file for text content in the temporary XML file in response to the determination that the temporary XML file has not been downloaded previously;

storing the text content in the temporary XML file into a database;

converting a relative path of the image URL to an absolute path by joining the URL of the web page to the front of the relative path of the image URL in response to the determination that that the temporary XML file contains image URLs;

storing the absolute path of each image URL in the temporary XML file and a current time into the database as attributes of a corresponding image;

generating a local path for each image in the temporary XML file and storing each image into a storage system according to the local path; and appending each local path to attributes of a corresponding image into the database.

4. The method of claim 3, wherein the predetermined information in the temporary XML file further comprises a creation/updated date of the web page corresponding to the temporary XML file.

5. A computer-readable medium having stored thereon instructions that, when executed by a computing device, causing the computing device to perform a method for downloading text content and images in web pages, the method comprising:

downloading a web page as a temporary extensible markup language (XML) file to a cache of an application server;

searching the temporary XML file for predetermined information in the temporary XML file, wherein the predetermined information in the temporary XML file comprises a uniform resource locator (URL) and a title of the web page corresponding to the temporary XML file;

searching the temporary XML file for text content in the temporary XML file in response to the determination that the temporary XML file has not been downloaded previously;

storing the text content in the temporary XML file into a database;

converting a relative path of the image URL to an absolute path by joining the URL of the web page to the front of the relative path of the image URL in response to the determination that that the temporary XML file contains image URLs;

storing the absolute path of each image URL in the temporary XML file and a current time into the database as attributes of a corresponding image;

generating a local path for each image in the temporary XML file and storing each image into a storage system according to the local path; and appending each local path to attributes of a corresponding image into the database.

6. The medium of claim 5, wherein the predetermined information in the temporary XML file further comprise a creation/updated date of the web page corresponding to the temporary XML file.

* * * * *